United States Patent
Hessbrueggen

(10) Patent No.: US 9,180,567 B2
(45) Date of Patent: Nov. 10, 2015

(54) Y-AXIS MACHINING APPARATUS

(71) Applicant: Norbert Hessbrueggen, Salach (DE)

(72) Inventor: Norbert Hessbrueggen, Salach (DE)

(73) Assignee: EMAG HOLDING GMBH, Salach (DE)

( * ) Notice: Subject to any disclaimer, the term of this patent is extended or adjusted under 35 U.S.C. 154(b) by 610 days.

(21) Appl. No.: 13/654,464

(22) Filed: Oct. 18, 2012

(65) Prior Publication Data

US 2013/0206438 A1     Aug. 15, 2013

(30) Foreign Application Priority Data

Oct. 28, 2011     (DE) .......................... 10 2011 117 155

(51) Int. Cl.

| | |
|---|---|
| *B23Q 1/64* | (2006.01) |
| *B23P 23/02* | (2006.01) |
| *B23Q 3/157* | (2006.01) |
| *B23Q 1/01* | (2006.01) |
| *B23B 7/04* | (2006.01) |

(Continued)

(52) U.S. Cl.
CPC .............. *B23Q 1/64* (2013.01); *B23F 23/1243* (2013.01); *B23Q 1/015* (2013.01); *B23Q 1/4876* (2013.01); *B23Q 1/621* (2013.01); *B23Q 3/15706* (2013.01); *B23B 3/065* (2013.01); *B23B 3/10* (2013.01); *B23F 5/24* (2013.01); *B23Q 1/4852* (2013.01); *B23Q 1/623* (2013.01); *B23Q 1/625* (2013.01); *B23Q 3/1578* (2013.01); *B23Q 7/047* (2013.01); *Y10T 29/5109* (2015.01); *Y10T 29/5176* (2015.01); *Y10T 82/2511* (2015.01); *Y10T 409/10159* (2015.01); *Y10T 409/307672* (2015.01); *Y10T 409/308232* (2015.01); *Y10T 483/16* (2015.01); *Y10T 483/1705* (2015.01); *Y10T 483/179* (2015.01); *Y10T 483/1733* (2015.01); *Y10T 483/1795* (2015.01)

(58) Field of Classification Search
CPC ...... B23Q 1/015; B23Q 1/017; B23Q 1/4876; B23Q 1/621; B23Q 1/64; B23F 23/1243; Y10T 409/307672; Y10T 409/308232; Y10T 409/308512; Y10T 409/309576; Y10T 483/1705; Y10T 483/1733; Y10T 483/1738; Y10T 483/179; Y10T 483/1793; Y10T 183/1795

USPC ........ 409/201, 211, 216, 235; 483/18, 27, 30, 483/32, 54, 55, 56

See application file for complete search history.

(56) References Cited

U.S. PATENT DOCUMENTS

| | | | |
|---|---|---|---|
| 2010/0202847 A1 | 8/2010 | Moser | |
| 2012/0125165 A1* | 5/2012 | Hessbrueggen et al. | ....... 82/1.11 |
| 2013/0210594 A1* | 8/2013 | Schuster | ........................ 483/22 |

FOREIGN PATENT DOCUMENTS

DE     102008055795 A1 *    5/2010

*Primary Examiner* — Erica E Cadugan
*Assistant Examiner* — Michael Vitale
(74) *Attorney, Agent, or Firm* — Andrew Wilford

(57) ABSTRACT

An apparatus for machining a workpiece with a tool has a columnar housing having an upright front face and a pair of upright and parallel side walls extending horizontally rearward from the front face, a carriage movable at least vertically on the front face carries a first holder for the workpiece or the tool. A U-shaped frame juxtaposed with the housing front face has two rigid arms each extending rearward adjacent the housing side walls with interfitting guides between each of the arms and the respective side wall enabling horizontal movement of the frame toward and away from the front face. A second holder on the frame and in front of the front wall holds the tool or the workpiece and is engageable with the workpiece or the tool, respectively, in the first holder.

11 Claims, 3 Drawing Sheets

(51) Int. Cl.
  *B23F 23/12* (2006.01)
  *B23Q 1/48* (2006.01)
  *B23Q 1/62* (2006.01)
  *B23F 5/24* (2006.01)
  *B23Q 7/04* (2006.01)
  *B23B 3/06* (2006.01)
  *B23B 3/10* (2006.01)

Y-AXIS MACHINING APPARATUS

FIELD OF THE INVENTION

The present invention relates to a machining apparatus. More particularly this invention concerns such an apparatus with the ability to work along the Y-axis.

BACKGROUND OF THE INVENTION

A machining apparatus for machining rotationally driven workpieces with Y-axis movement are known in the prior art. US 2010/0202847 shows a machining apparatus having a vertical main spindle, tool turret, and a hobber. The machining units are mounted on the front vertical wall of the machine frame. The tool turret and the hobber can be moved vertically and horizontally on a compound slide. In addition, the hobbing spindle includes a swivel axis (B axis) and a shift axis, and can furthermore be moved in a third axis (Y axis). Guides in the direction of the Y axis are mounted in front of the vertical wall of the machine frame. This necessarily results in a relatively large distance between the rotation axes and the frame wall, which distance negatively affects the flow of power and machine rigidity.

OBJECTS OF THE INVENTION

It is therefore an object of the present invention to provide an improved y-axis machining apparatus.

Another object is the provision of such an improved y-axis machining apparatus that overcomes the above-given disadvantages, in particular that has a compact design and improved machine rigidity.

SUMMARY OF THE INVENTION

An apparatus for machining a workpiece with a tool has according to the invention a columnar housing having an upright front face and a pair of upright and parallel side walls extending horizontally rearward from the front face, a carriage movable at least vertically on the front face carries a first holder for the workpiece or the tool. A U-shaped frame is juxtaposed with the housing front face has two rigid arms each extending rearward adjacent the housing side walls with interfitting guides between each of the arms and the respective side wall enabling horizontal movement of the frame toward and away from the front face. A second holder on the frame and in front of the front wall holds the tool or the workpiece and is engageable with the workpiece or the tool, respectively, in the first holder.

Thus according to the invention, a U-shaped slide that is movable in the direction of the Y axis of the machine coordinate system is movably guided along guide rails on the two arms of the U-shaped frame on parallel mutually opposing side walls of the machine housing. In an especially advantageous approach, the driving forces for positioning the slide are introduced symmetrically through the two arms. A vertical slide for a motor spindle is mounted in the top section on the front wall of the machine housing.

This configuration enables a symmetrical flow of force to be achieved overall, and specifically also for the assemblies of the Y axis. This has an especially positive effect on the rigidity of the machine. The machining apparatus can also operate on the pick-up principle. A motor spindle with a clamping chuck for workpieces is movable horizontally (X axis) in suspended fashion. The motor spindle moves to a pick-up or placement position for loading and unloading. Rotary-driven tools for hobbing, grinding, milling, or honing are provided on the slide (Y axis).

The high degree of machine rigidity means that the machining apparatus is especially well suited for precision machining operations such as grinding or honing. However, it can also be advantageously used for precise hobbing operations. In the case of a hand-loaded machine, the workpiece spindle is mounted stationarily on the slide and can move in the Y axis, while the motor spindle can be moved in suspended fashion on the vertical slide from the machining position to the workpiece changing position in order to pick up tools.

BRIEF DESCRIPTION OF THE DRAWING

The above and other objects, features, and advantages will become more readily apparent from the following description, reference being made to the accompanying drawing in which.

DETAILED DESCRIPTION

Figure 1:
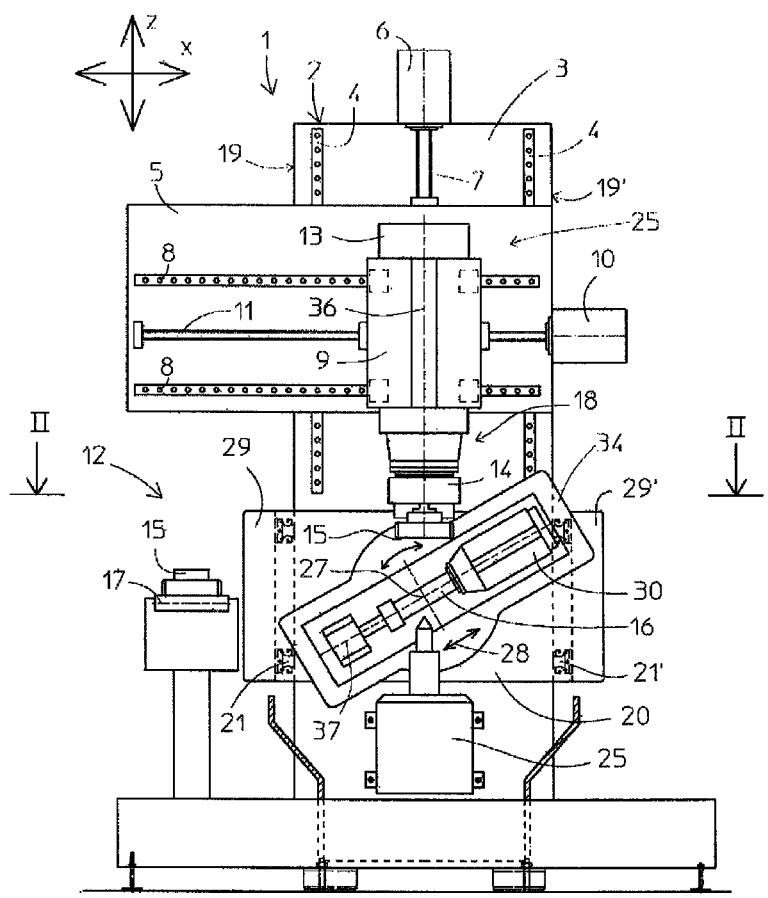
FIG. 1 is a front view of a machining apparatus for hobbing.
Figure 2:
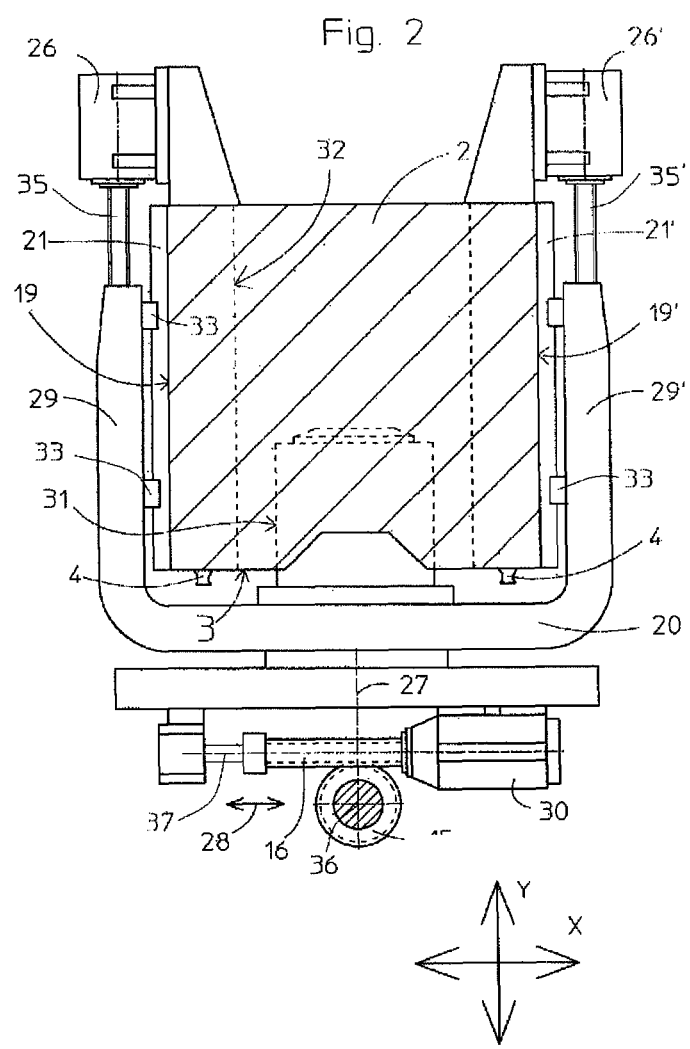
FIG. 2 is a section taken along plane II-II of FIG. 1 through the machining apparatus.

As seen in FIGS. 1 and 2 a machining apparatus 1 according to the invention has a square-section columnar housing 2 with a planar and vertical front wall 3 formed with a central hole 32 (FIG. 2) and a pair of parallel and vertical side walls 19 and 19' extending rearward perpendicularly from the front wall 3. A pair of horizontally spaced and guide rails 4 extending parallel to a vertical Z-axis carry a cantilevered carriage plate 5 that can be moved vertically by a motor 6 fixed atop the housing 2 and connected via a ball spindle 7 to the carriage 5 to raise and lower it on the front wall 3 parallel to the Z-axis.

A holder or headstock 9 rides on vertically spaced rails 8 extending parallel to a horizontal X-axis and fixed to the front face of the carriage plate 5. This carriage plate 5 is cantilevered laterally above a workpiece conveyor 17 that can move unmachined workpieces 15 into and out of a station 12. These workpieces 15 can be picked up by a holder or chuck 14 carried by the headstock 9 and moved horizontally parallel to the X-axis into a machining station 18 located centrally in front of the front wall 3 between the rails 4, and later finished workpieces 15 can be off by the chuck 14 in the station 12 and carried off. A motor 13 can rotate the chuck 14 and any workpiece 15 in it about a vertical axis 36.

A massive U-shaped (seen from above) frame 20 has a pair of full-height arms 29 and 29' juxtaposed with the side walls 19 and 19' and each provided with shoes 33 riding on horizontal upper and lower rails 21 and 21' provided on the side walls 19 and 19'. The rails 21 and 21' extend horizontally parallel to a Y-axis perpendicular to the X- and Z-axes. A pair of synchronous drives 26 and 26' are connected by ball spindles 35 and 35' (FIG. 2) to the arms 29 and 29' of the U-shaped frame 20 to move it horizontally forward and back, parallel to the Y-axis. Instead of the shoes 33 being on the frame 20 and the rails 21 and 21' on the housing 2, the situation could be reversed with the rails 21 and 21' on the frame 20 and the shoes 30 on the housing 2. The tool 16 engages one of the workpieces 15 in the machining station 18 as is well known in the art.

A support 34 is pivotal by a motor 31 (FIG. 2) in the housing cavity 32 perpendicular to the axis 36 on the planar and vertical front face 3 of the frame 20 about a horizontal axis 27, the so-called C-axis, perpendicular to the face 3 and parallel to the Y-axis. This plate 34 acts as a holder carrying a tool 16 rotatable by a drive 30 about an axis 37 and also shiftable by the drive 30 in a direction 28, the so-called B-axis, parallel to this axis 37 as is well known for hobbing.

The recessing of the motor 31 into the housing 2, the nearly flush mounting of the plate support 34 on the frame 20, and the large vertical spacing of the rails 21 and 21', impart considerably rigidity to the machining apparatus 1 and make it possible to position the tool 16 very accurately.

Figure 3:
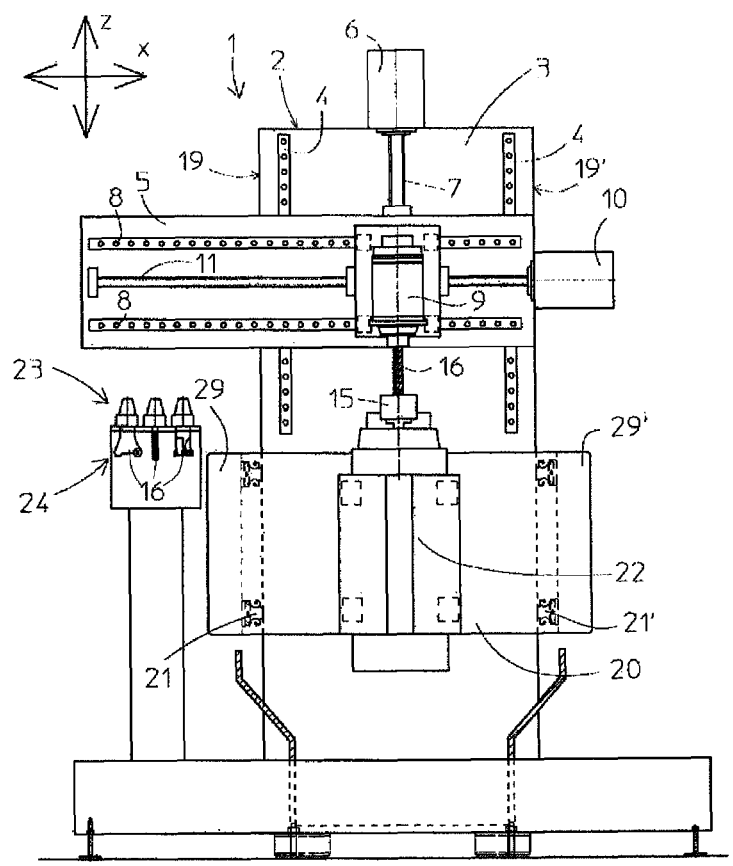
FIG. 3 shows the machining apparatus with a stationary workpiece spindle.

FIG. 3 shows a hand-loaded version of the machine 1 where a workpiece holder 22 is fixed to the frame 20 and the holder 9 is used to hold one of the tools 16 to machine it, here shown drilling an axially centered hole in the held workpiece. To this end a turret 24 is provided in a tool station 23 carrying a plurality of tools 16 and located in the position of the loading/unloading station 12 of FIGS. 1 and 2.

I claim:

1. An apparatus for machining a workpiece with a tool, the apparatus comprising:
    a columnar housing having an upright front wall and a pair of upright and parallel side walls extending horizontally rearward from the front wall;
    a carriage movable at least vertically on the front wall;
    a first holder for the workpiece or the tool mounted on the carriage for movement therewith;
    a U-shaped frame juxtaposed with the housing front wall and having two rigid arms each extending rearward adjacent the housing side walls;
    interfitting guides between each of the arms and the respective side wall enabling horizontal movement of the frame toward and away from the front wall;
    drive means for horizontally shifting the frame on the housing toward and away from the front wall; and
    a second holder on the frame and in front of the front wall for holding the tool or the workpiece engageable with the workpiece or the tool, respectively, in the first holder.

2. The machining apparatus defined in claim 1, wherein the front wall is planar and vertical and the carriage is a plate juxtaposed with the front wall, the apparatus further comprising:
    vertical guides between the front wall and the carriage plate for vertical movement of the carriage plate relative to the housing; and
    drive means for vertically shifting the carriage plate relative to the housing.

3. The machining apparatus defined in claim 2, further comprising:
    horizontal guides between the carriage plate and the first holder for horizontal movement of the first holder relative to the carriage plate; and
    drive means for horizontally shifting the first holder relative to the carriage plate.

4. The machining apparatus defined in claim 3, wherein the first holder is adapted to hold the workpiece and the second holder is adapted to hold the tool, the first holder being shiftable between a machining position directly above the second holder and a loading and unloading position offset horizontally from the machining position, the apparatus further comprising:
    a workpiece conveyor extending underneath a loading and unloading station.

5. The machining apparatus defined in claim 4, wherein the second holder is pivotal on the frame about a horizontal axis substantially perpendicular to the front wall.

6. The machining apparatus defined in claim 5, wherein the tool is rotatable about and shiftable along an axis parallel to the front wall and perpendicular to the horizontal axis about which the second holder pivots on the frame.

7. The machining apparatus defined in claim 6, further comprising a drive motor recessed behind the front wall for pivoting the second holder about the horizontal axis.

8. The machining apparatus defined in claim 3, wherein the first holder is adapted to hold the tool and the second holder is adapted to hold the workpiece and is fixedly mounted on the frame underneath the first holder, the first holder being shiftable between a machining position directly above the second holder and a tool-changing position offset horizontally from the machining position, the apparatus further comprising:
    a tool turret at the tool-changing position holding a plurality of the tools.

9. The machining apparatus defined in claim 1, wherein one of the holders is a chuck.

10. The machining apparatus defined in claim 1, wherein the tool is a hobber, grinder, or miller.

11. The machining apparatus defined in claim 1, wherein the drive means is a pair of synchronous motors each coupled between the housing and a respective one of the arms of the frame.

* * * * *